(12) United States Patent
Ishimura et al.

(10) Patent No.: US 6,469,696 B1
(45) Date of Patent: Oct. 22, 2002

(54) POSITION DETECTOR

(75) Inventors: Yoshifumi Ishimura, Tokyo (JP); Hirotsugu Tomizawa, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/415,212

(22) Filed: Oct. 12, 1999

(30) Foreign Application Priority Data

Oct. 19, 1998 (JP) ............................................ 10-296322

(51) Int. Cl.$^7$ ............................ G09G 3/02; G08C 21/00
(52) U.S. Cl. ..................... 345/174; 345/179; 178/18.01; 178/18.07; 178/19.03
(58) Field of Search ................................ 345/173–183, 345/104; 178/18.01–18.11, 19.01–19.07

(56) References Cited

U.S. PATENT DOCUMENTS

| | | | | |
|---|---|---|---|---|
| 4,875,036 A | * | 10/1989 | Washizuka et al. | 345/104 |
| 5,218,173 A | * | 6/1993 | Garwin et al. | 178/18 |
| 5,404,444 A | * | 4/1995 | Billings | 395/349 |
| 5,485,176 A | * | 1/1996 | Ohara et al. | 345/179 |
| 5,486,847 A | * | 1/1996 | Ranf et al. | 345/173 |
| 5,675,130 A | * | 10/1997 | Sekizawa | 178/18 |

* cited by examiner

*Primary Examiner*—Lun-Yi Lao
(74) *Attorney, Agent, or Firm*—Dickstein Shapiro Morin & Oshinsky LLP (57) ABSTRACT

There is provided a position detector including a member having a surface and a plurality of vertically and horizontally arranged antennas; a controller for sequentially driving the vertically arranged antennas in vertical positive and vertical negative directions, and for sequentially driving the horizontally arranged antennas in horizontal positive and horizontal negative directions so that the antennas sequentially radiate radio waves; a receiver for receiving the sequentially radiated radio waves on the surface of the member; and a detector for detecting the position of the receiver on the surface of the member based on the levels of the received radio waves. The detector detects the position of the receiver as an average position for a first position detected based on the levels of the radio waves which are sequentially radiated in the vertical positive and horizontal positive directions, and a second position detected based on the levels of the radio waves which are sequentially radiated in the vertical negative and horizontal negative directions. Therefore, since the receiver position detected by the detector does not vary, no delay time adjustment circuit is required, and the position of the receiver can be accurately detected.

2 Claims, 6 Drawing Sheets

POSITION DETECTOR

BACKGROUND OF THE INVENTION

1. Field of the Invention

The present invention relates to a position detector for detecting a designated position on a tablet in which a plurality of antennas are vertically and horizontally arranged, as a matrix.

2. Related Arts

A position detector is known which includes a plane member, called a tablet, in which a plurality of antennas are arranged as a matrix and a touch pen used for selecting a position on the tablet, and which can detect the position on the tablet which is selected by using the touch pen.

Figure 6A:
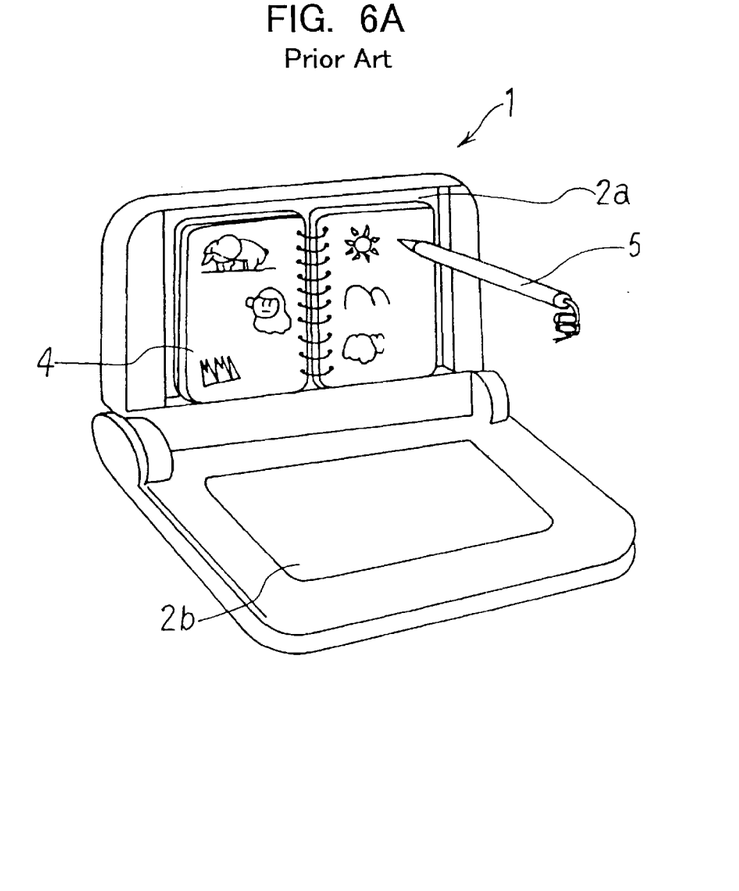
FIGS. 6A and 6B are diagrams showing an example where the position detector is applied to an electronic apparatus used as an educational toy for children.
Figure 6B:
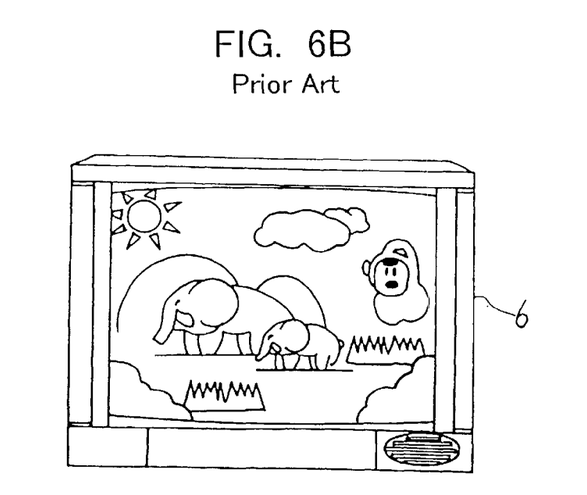

FIGS. 6A and 6B are diagrams showing an example where the position detector is applied for an electronic apparatus used as an educational toy for children. In FIG. 6A, a toy 1 includes a book tablet 2a and a front tablet 2b, and a specific picture book 4, which is placed on the book tablet 2a. When operating the toy, a player uses the touch pen 5 to select a FIGURE, character or symbol in the picture book 4, pressing the touch pen 5 against or bringing it near an illustration. Then, as is shown in FIG. 6B, the selected figure, etc., is displayed on a monitor 6.

Further, when the player uses the touch pen 5 to draw a desired FIGURE or character on the front tablet 2b, the locus of the touch pen 5 is displayed on the monitor 6.

Figure 7:
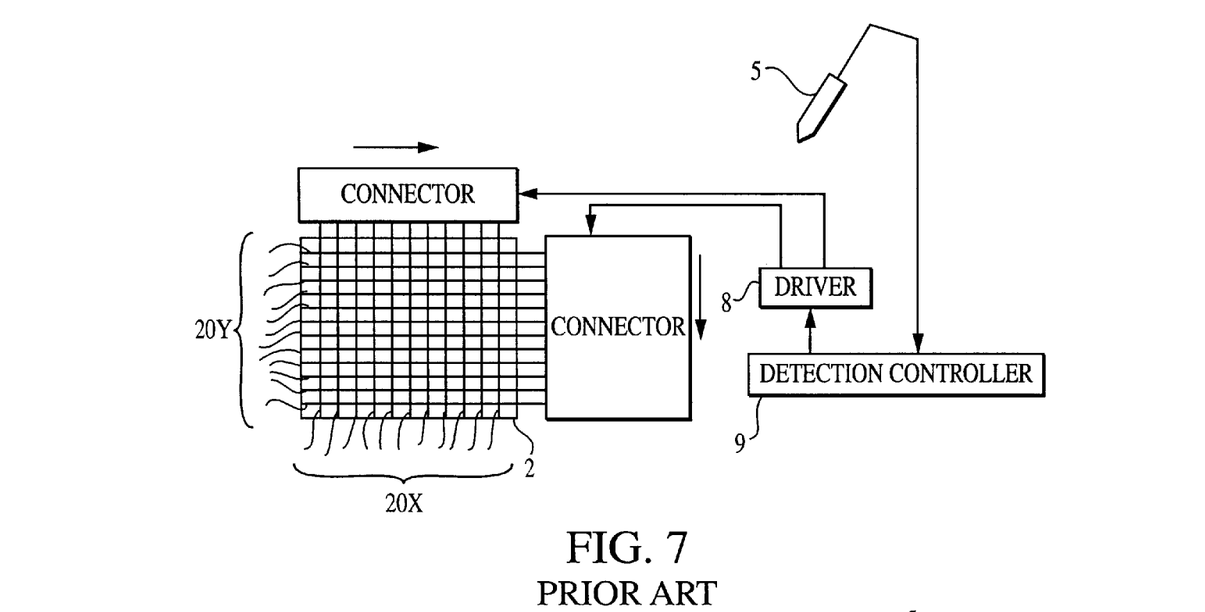
FIG. 7 is a diagram for explaining the principle of the detection of a position on a tablet which is selected by using a touch pen.

FIG. 7 is a diagram for explaining the principle employed for the detection of a position on the tablet 2 selected by using the touch pen 5. As is shown in FIG. 7, the tablet 2 includes a plurality of horizontally arranged antennas 20X and a plurality of vertically arranged antennas 20Y. Under the control of a detection controller 9, an antenna driver 8 drives the horizontal antennas 20X in the order from right to left, and the vertical antennas 20Y in the order from top to bottom, which sequentially radiate radio waves.

The radio waves radiated by the antennas are received at a reception antenna (not shown) incorporated in the touch pen 5. Of the level of the received radio waves, the strongest level is that radiated by the antennas which is nearest to the position selected using the touch pen 5. By comparing the levels of received waves and identifying the strongest level in the vertical and the horizontal directions, the detection controller 9 can detect a selected position.

Figure 8:
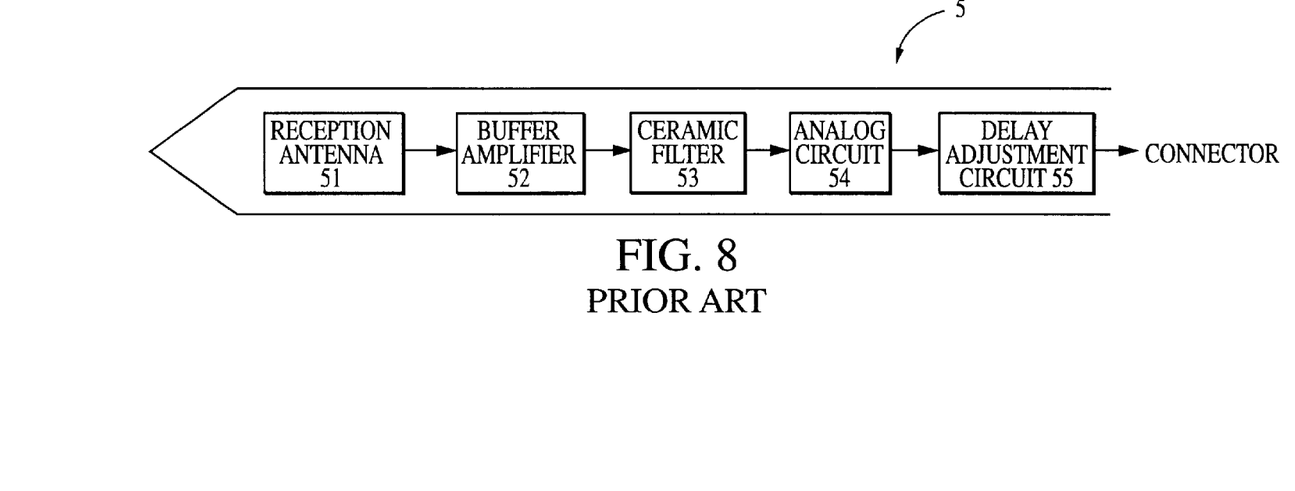
FIG. 8 is a block diagram illustrating the touch pen.

FIG. 8 is a block diagram illustrating the touch pen 5. In FIG. 8, radio waves radiated by the antennas on the tablet 2 are received by a reception antenna 51 incorporated in the tip of the touch pen 5. A reception signal is amplified by a buffer amplifier 52, and the resultant signal is passed through a ceramic filter 53. The ceramic filter 53, which permits only a single frequency to pass and blocks all others, performs a noise removal function.

The reception signal is then converted by a comparator included in an analog circuit 54 into a level signal which is compared with a predetermined threshold level. The level signal is passed through a delay time adjustment circuit 55 and a connector to a calculation circuit (not shown) for detecting a position selected with the touch pen 5.

The delay time adjustment circuit 55 is provided to perform following functions. A variable delay time is provided for the ceramic filter 53 incorporated in the touch pen 5, and therefore, if a plurality of touch pens 5 are used to select the same position on the tablet 2, the delay times for the respective incorporated ceramic filters 53 will vary, and different positions will be detected. For example, even when the center of the tablet 2 is selected by using the touch pens 5, the detected position will be shifted in the vertical and horizontal directions in which the antennas are driven. Thus, since the delay times for the ceramic filters 53 vary, the distance shifted will differ for the individual touch pens 5. In order to prevent such an inconvenience, the delay time adjustment circuits 55 make an adjustment for the a variance in the delay times for the ceramic filters 53, so that a constant delay time is provided for all the touch pens 5.

However, the provision of the additional delay time adjustment circuit 55 increases the cost of a touch pen 5, and accordingly, the overall cost of a position detector is increased.

SUMMARY OF THE INVENTION

It is, therefore, one objective of the present invention to provide an inexpensive position detector for which the delay time for a ceramic filter need not be adjusted, i.e., an apparatus for which a delay time adjustment circuit is not required.

It is another objective of the present invention to provide a position detector which, without delay time adjustment circuits being required, can accurately detect a position when that position is simultaneously selected with a plurality of touch pens.

To achieve the above objectives of the present invention, there is provided a position detector comprising:

- a member having a surface and a plurality of vertically and horizontally arranged antennas;
- a controller for sequentially driving the vertically arranged antennas in vertical positive and vertical negative directions, and for sequentially driving the horizontally arranged antennas in horizontal positive and horizontal negative directions so that the antennas sequentially radiate radio waves;
- a receiver for receiving the sequentially radiated radio waves on the surface of the member; and
- a detector for detecting the position of the receiver on the surface of the member based on the levels of the received radio waves.

Preferably, the detector detects the position of the receiver as an average position for a first position detected based on the levels of the radio waves which are sequentially radiated in the vertical positive and horizontal positive directions, and a second position detected based on the levels of the radio waves which are sequentially radiated in the vertical negative and horizontal negative directions.

With this arrangement, variances relative to the position of a receiver which could be picked up by the detector are eliminated, without an adjustment by a delay time adjustment circuit being required, and the position of the receiver can be accurately detected.

DETAILED DESCRIPTION OF THE PREFERRED EMBODIMENT

Figure 1:
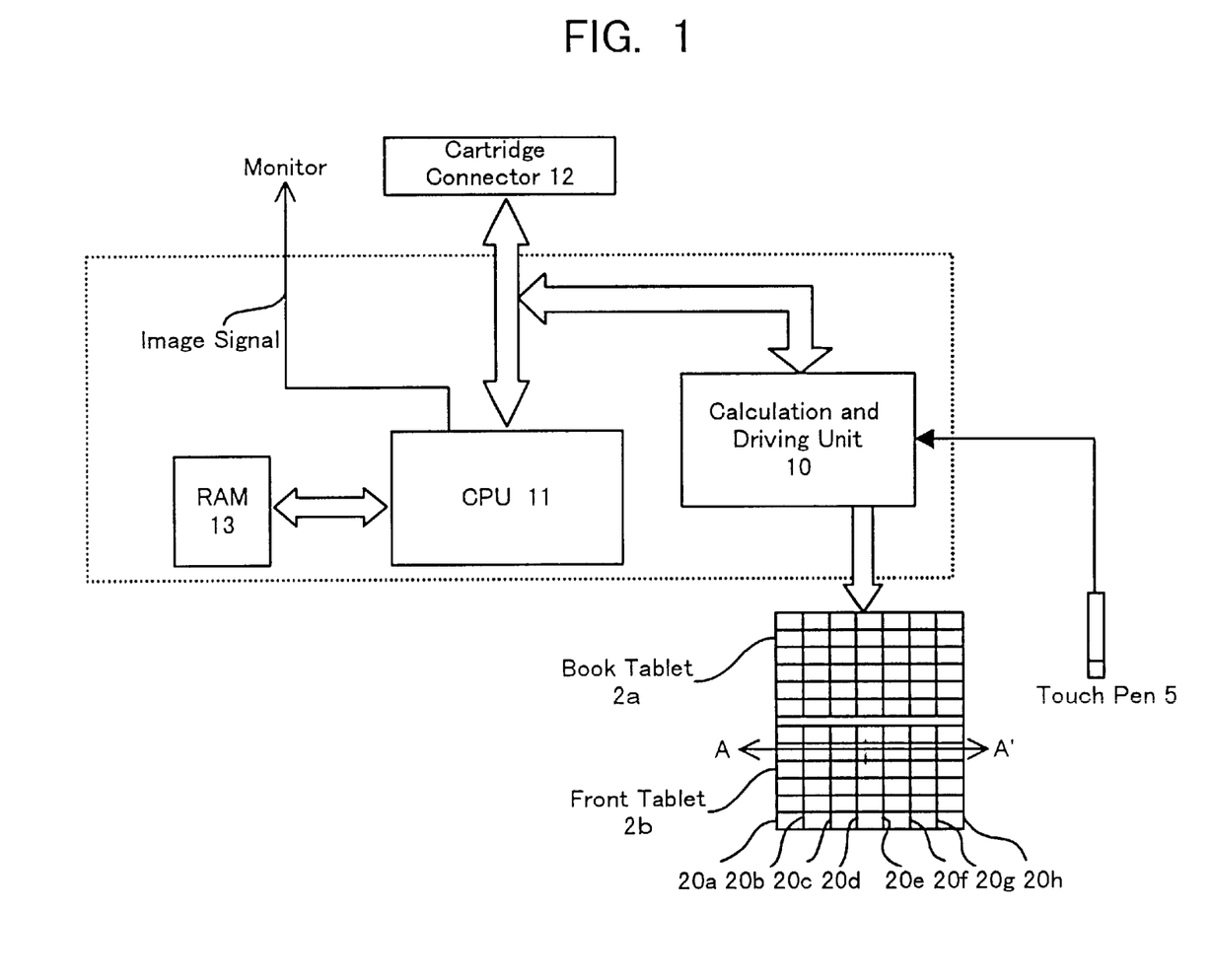
FIG. 1 is a block diagram illustrating a position detector according to one embodiment of the present invention.

FIG. 1 is a block diagram illustrating a position detector according to one embodiment of the present invention. The position detector in FIG. 1 is applied to an electronic apparatus for use as an educational toy. In FIG. 1, in the position detector two tablets (a book tablet 2a and a front tablet 2b), on which antennas are arranged like a matrix and a touch pen 5 are connected to a calculation and driving unit 10. The calculation and driving unit 10 drives the antennas of the tablet 2, and calculates the position (coordinates) selected with the touch pen 5 based on the levels of signal received by the touch pen 5, as will be described later in detail.

A cartridge ROM (not shown), in which, for example, an image processing program for a picture book placed on the book tablet 2a is stored, is loaded into a cartridge connector 12, and this program is processed by a CPU 11.

In accordance with the program and the coordinates of the touch pen 5 position obtained by the calculation and driving unit 10, the CPU 11 performs corresponding image processing and generates an image signal. The image signal is output to a monitor, and a predetermined image, e.g., a FIGURE, character or symbol on the picture book, including the obtained coordinates, is displayed on the monitor screen. A RAM 13 is a memory for temporarily storing data during the processing performed by the CPU 11.

Figure 2:
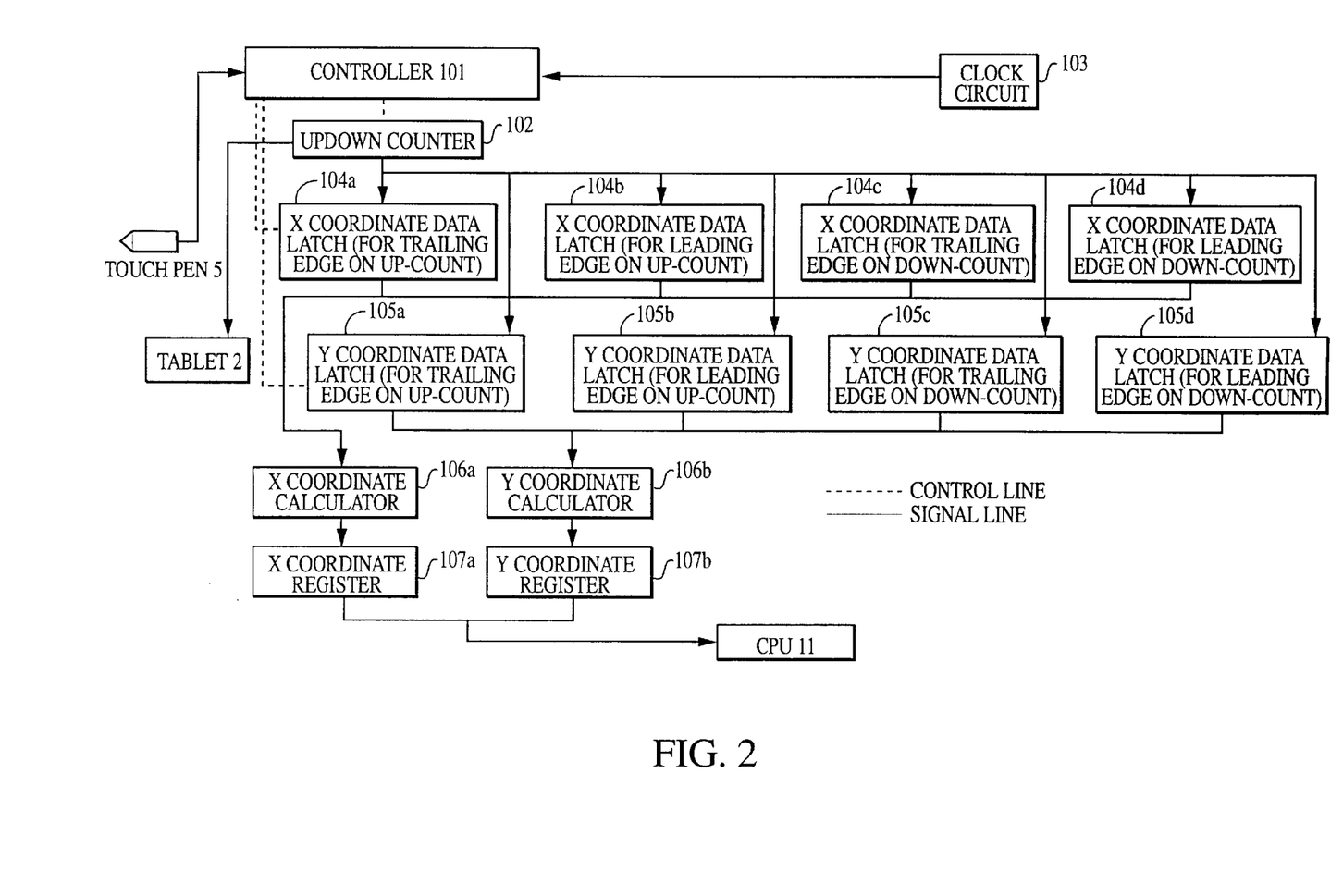
FIG. 2 is a block diagram illustrating a calculation driver.
Figure 3A:
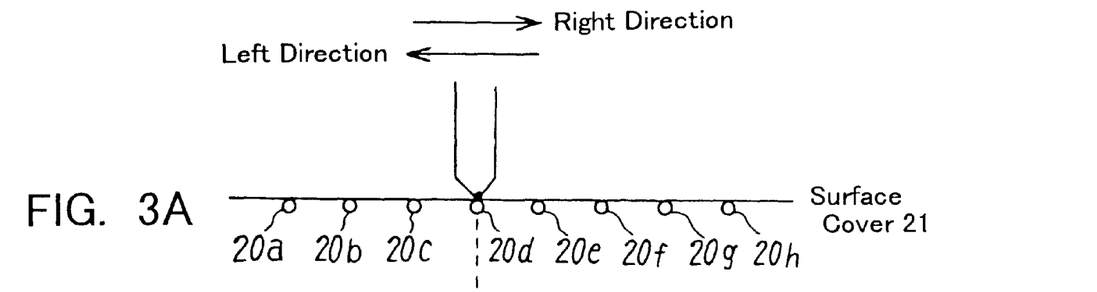
FIGS. 3A to 3E are a cross-sectional view of a tablet and diagrams of an example reception signal and an example level signal at a touch pen.

FIG. 2 is a block diagram illustrating the calculation and driving unit 10. FIGS. 3A to 3E are a cross-sectional view of the tablet 2 and diagrams of an example reception signal and an example level signal at the touch pen 5. Specifically, FIG. 3A is a cross-sectional view taken along line A–A' in FIG. 1. From among eight horizontally arranged antennas (20a to 20h), an antenna 20d is selected with the touch pen 5 on the surface cover 21 of the tablet 2. FIGS. 3B to 3E are diagrams showing a reception signal and a level signal at the touch pen 5 in the state depicted in FIG. 3A. The operation of the calculation and driving unit 10 in FIG. 2 will now be described while referring to FIGS. 3A to 3E.

A controller 101 in FIG. 2 controls up-count and down-count of an up-down counter (hereinafter referred to simply as a counter) 102, detects the trailing edge and the leading edge of a level signal at the touch pen 5, and synchronizes the level signal with a clock signal received from a clock circuit 103.

Figure 3B:
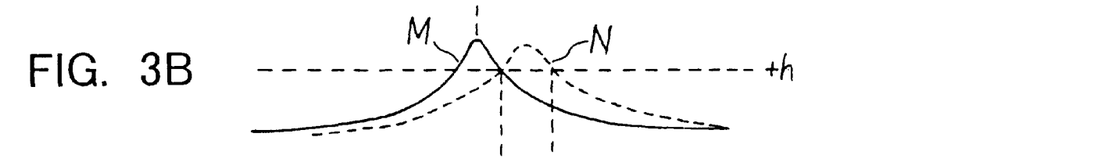
Figure 3C:
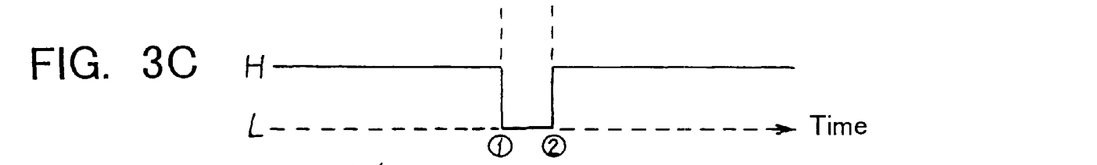

A drive signal from the counter 102 is supplied to the tablet 2. And as the counter 102 up-counts, the antennas 20a to 20h in FIG. 3A radiate radio waves sequentially in the order of the antenna 20a, 20b, 20c, . . . to 20h (from the left to the right) at each time the count value is incremented a predetermined counts (e.g., 16 counts). In FIG. 3B, is shown a signal (solid line) received at the touch pen 5 at this time. Since the touch pen 5 is nearer the antenna 20d, at the touch pen 5 the reception level for the radio wave radiated by the antenna 20d is the strongest. However, the reception signal is delayed when it is passed through the ceramic filter 53 in the touch pen 5. As is indicated by broken line N, the signal passed through the ceramic filter 53 is shifted to the right from solid line M. Therefore, as is shown in FIG. 3C, the level signal, which is to be compared with a threshold level (th) and output by the comparator in the touch pen 5, is also shifted. Based on a control signal received from the controller 101, the counter values corresponding to trailing edge ② and leading edge ② of the level signal are respectively stored in X coordinate data latches 104a and 104b.

Figure 3D:
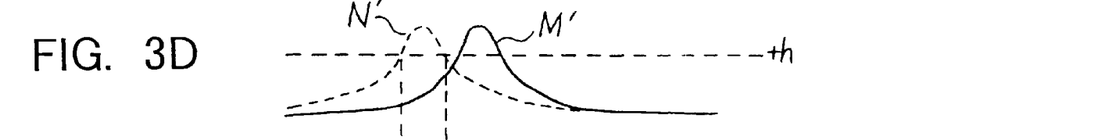
Figure 3E:
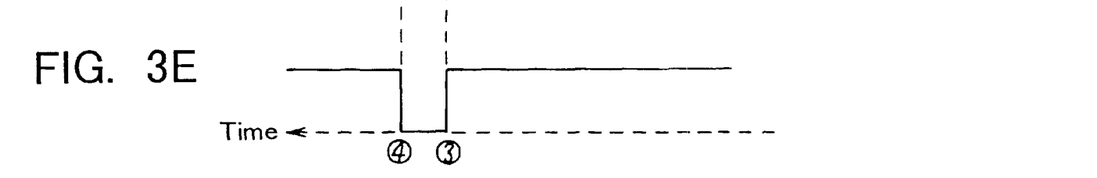

When the radiation of radio waves progressing to the right is terminated, the radiation of radio waves progressing to the left is begun. That is, the counter 102 down-counts, the antennas 20a to 20h radiate radio waves sequentially in the order of the antenna 20h, 20g, 20f, . . . to 20a (from the right to the left) at each time the count value is decremented a predetermined counts (e.g., 16 counts). In FIG. 3D, a signal (solid line) received by the touch pen 5 is shown. Since the touch pen 5 is nearer the antenna 20d, at the touch pen 5 the reception level for the radio wave radiated by the antenna 20d is the strongest, as it was in FIG. 3B. In addition, since the radio waves are radiated sequentially, progressing to the left, as is indicated by broken line N', the received signal passed through the ceramic filter 53 is shifted to the left from solid line M'. Accordingly, as is shown in FIG. 3E, the level signal output by the comparator is shifted to the left. The counter values for the trailing edge ③ and the leading edge ④ of the level signal are respectively stored in X coordinate data latches 104c and 104d.

The counter values stored in the X coordinate data latches 104a, 104b, 104c and 104d are transmitted to an X coordinate calculator 106a. The X coordinate calculator 106a obtains X coordinate X(R) for radiation progressing to the right and X coordinate X(L) for the radiation progressing to the left by using the following equations:

$$X(R) = (\text{counter value for ①} + \text{counter value ②})/2 \quad (1)$$

$$X(L) = (\text{counter value for ③} + \text{counter value ④})/2 \quad (2)$$

That is, according to the calculations, the center position, between the trailing edge and the leading edge, is the position selected with the touch pen 5. The obtained X coordinates X(R) and X(L) are stored in an X coordinate register 107a.

However, as is described above, the obtained X coordinates X(R) and X(L) are shifted to the right and the left, and are not the true coordinates selected with the touch pen 5. Therefore, the following additional calculation is performed to obtain true coordinate X(D):

$$X(D) = (X(R) + X(L))/2 \quad (3).$$

That is, since the distance shifted due to the right radiation is the same as that due to the left radiation, the true coordinate X(D) can be obtained as the average of the X coordinates X(R) and X(L), i.e., the coordinate positioned midway between the X coordinates X(R) and X(L). In this embodiment, the CPU 11 in FIG. 1 calculates equation (3); however, the calculation and driving unit 10 may perform the calculation.

The same process as is performed for the X coordinate is also performed for the Y coordinate. Then, when the horizontal radiation of radio waves is terminated, the vertical radiation of radio waves is begun. As the counter 102 up-counts and down-counts, the radio waves are sequentially radiated, bidirectionally, i.e., upward and downward, by the vertically arranged antennas. The leading edge and the trailing edge of the level signal at the touch pen 5 are stored in Y coordinate data latches 105a, 105b, 105c and 105d, and a Y coordinate calculator 106b performs the same calculations as those in equations (1) and (2). As a result, Y coordinate Y(R) for the upward radiation and Y coordinate Y(L) for the downward radiation can be obtained.

The thus obtained Y coordinates Y(R) and Y(L) are stored in a Y coordinate register 107b. Then, the CPU 11 performs the same calculation for these Y coordinates as that which was performed in equation (3), so that the true Y coordinate Y(D) is obtained.

As is described above, since the radio waves radiated by the antenna 20 are radiated bidirectionally instead of unidirectionally, as is done conventionally, the shifting of the coordinates due to a delay can be offset. Therefore, the correct coordinates can always be obtained, without any adjustments for delay being required.

Thus, the delay adjustment circuit conventionally incorporated in the touch pen 5 is not required, and the labor involved in providing the circuit and the manufacturing costs can be reduced.

Since the radio waves are sequentially radiated bidirectionally instead of unidirectionally, as is done conventionally, the time required for position detection is twice that which is conventionally required. However, if the number of antennas is substantially reduced to half the conventional number, the same position detection time can be provided as that which is required conventionally.

If the number of antennas is reduced, the interval between the antennas may be increased and accuracy of the position detection may deteriorate. In this embodiment, however, the level of the drive signal for the antenna is increased (e.g., doubled), so that both the output level of a radio wave and the level of a received signal are increased. Further, since the threshold level (th) of the comparator for converting a received signal into a level signal is increased, the conventional position detection accuracy can be maintained. Conventionally, since the position detection is performed only through analog processing, a radio wave is radiated by transmitting to the antennas a sine wave signal of 2.5V. In this embodiment, however, since position detection is performed through digital processing, a rectangular wave signal of 5V is transmitted to the antennas.

Figure 4A:
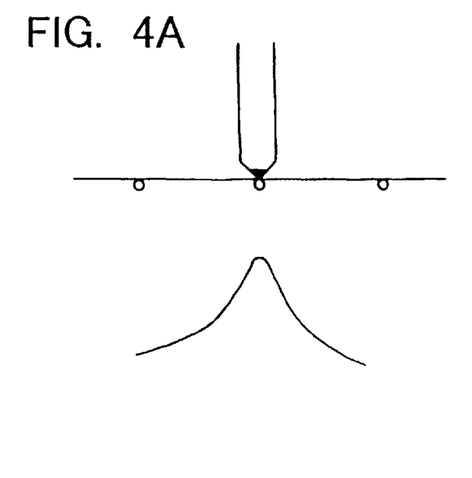
FIGS. 4A to 4D are diagrams for explaining the distortion of a reception signal.
Figure 4B:
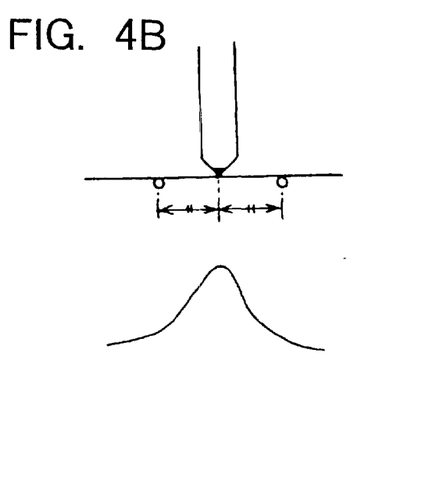
Figure 4C:
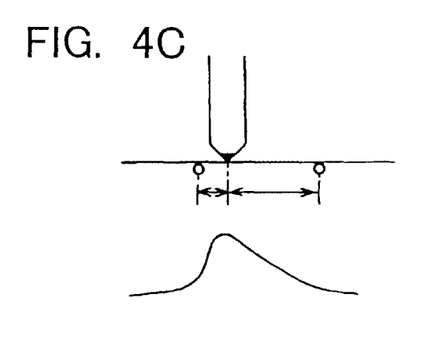
Figure 4D:
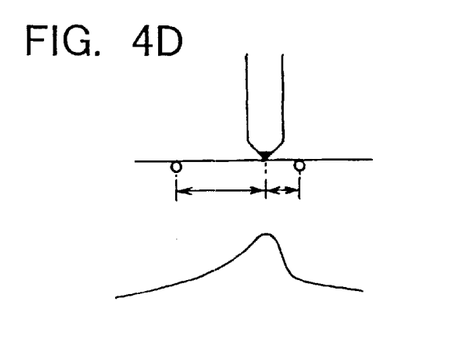

In addition, since the output level of a radio wave and the interval between antennas is increased, a remarkable distortion of the waveform of a received signal may appear when a position on the antenna is not selected with the touch pen 5. FIGS. 4A to 4D are diagrams for explaining the distortion of a received signal. In FIG. 4A is shown the waveform of a received signal when a position just on the antenna is selected with the touch pen 5, and no distortion appears. In FIG. 4B is shown the waveform of a received signal when a position midway between antennas is selected with the touch pen 5. Since the distances from both antennas are equal, no distortion occurs. In FIGS. 4C and 4D, however, signals are shown that are received when a position selected with the touch pen 5 is shifted slightly away from an antenna. The waveforms are so distorted that they are asymmetrical to the peak. And when the waveform of a received signal is thus distorted, the detected coordinate position is shifted away from the true.

Figure 5:
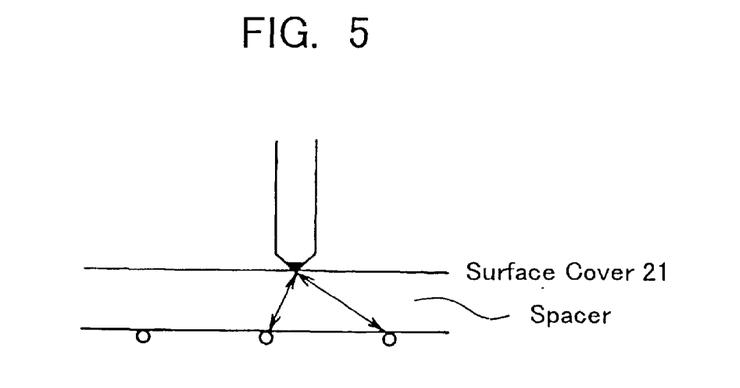
FIG. 5 is a partial cross-sectional view of a tablet where a spacer is provided between an antenna and a surface cover.

A received signal is distorted because the difference in the distance from the touch pen 5 to the antenna on either side is increased, and a difference in the strength of the reception levels for the antenna on one side and for the antenna on the other side is increased. Conventionally, since the interval between the antennas is comparatively small (because a large number of antennas are employed) and the output level of a radio wave is low, the difference in the reception levels is small and the distortion of a received signal is insignificant and can be ignored. To reduce difference of distances between touch pen 5 and antennas on both sides, in this embodiment a spacer 22 is provided between the antennas and a surface cover 21. FIG. 5 is a partial cross-sectional view of a tablet 2 for which a spacer 22 is provided between the antennas 20 and the surface cover 21. Since the difference of the distances between the touch pen 5 and the antennas 20 on both sides is reduced, the distortion of a received signal can be suppressed.

The distortion of a received signal can also be prevented by sandwiching a radio attenuation sheet between the antennas and the surface cover.

With this arrangement, the number of antennas can be reduced without deterioration of the position detection accuracy occurring, and accordingly, manufacturing costs can be reduced. Therefore, a delay adjustment circuit is not necessary and the overall cost of manufacturing the position detector can be reduced.

As is described above, according to the present invention, since a position selected by using a touch pen can be accurately detected without an adjustment being needed for a delay caused by a ceramic filter, which is incorporated in the touch pen, a delay adjustment circuit is not required, and the cost of manufacturing the position detector can be reduced.

Since a predetermined gap is provided between the antennas and the tip of the touch pen, the distortion of a received signal, which tends to occur when the distance to the antennas is increased by reducing the number of antennas, can be prevented.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A position detector comprising:
    a member having a surface, a plurality of vertically and horizontally arranged antennas, and a spacer for providing a predetermined gap between the surface and the plurality of vertically and horizontally arranged antennas;
    a controller for sequentially driving the vertically arranged antennas in vertical positive and vertical negative directions, and for sequentially driving the horizontally arranged antennas in horizontal positive and horizontal negative directions so that the antennas sequentially radiate radio waves;
    a plurality of receivers for receiving the sequentially radiated radio waves on the surface of said member, each of said receivers including a filter for passing a predetermined frequency band, each filter having a different characteristic delay time; and
    a detector for detecting the position of said receivers on the surface of said member as an average position of a first position based on the received levels of the radio waves which are sequentially radiated in the vertical positive and vertical negative directions, and a second position based on the received levels of the radio waves which are sequentially radiated in the horizontal positive and horizontal negative directions so as to cancel the delay times of the filters and to eliminate different detection results for each of the receivers.

2. An electronic apparatus for outputting information corresponding to characters, figures and symbols described in a specific book, comprising:

a member having a surface and a plurality of vertically and horizontally arranged antennas above which the specific book is placed, said member having a spacer for providing a predetermined gap between the surface and the plurality of vertically and horizontally arranged antennas;

a controller for sequentially driving the vertically arranged antennas in vertical positive and vertical negative directions, and for sequentially driving the horizontally arranged antennas in horizontal positive and horizontal negative directions, so that the antennas sequentially radiate radio waves;

a plurality of pen members for selecting a position on the specific book, and for receiving the radio waves at the selected position, each of said pen members including a filter for passing a predetermined frequency band, each filter having a different characteristic delay time;

a detector for detecting the selected position on the surface of said member as an average position of a first position based on the received levels of the radio waves which are sequentially radiated in the vertical positive and vertical negative directions, and a second position based on the received levels of the radio waves which are sequentially radiated in the horizontal positive and horizontal negative directions so as to cancel the delay times of the filters and to eliminate different detection results for each of the pen members; and an output unit for outputting the information corresponding to the detected position.

* * * * *